United States Patent
Ozaki et al.

(10) Patent No.: US 6,726,544 B2
(45) Date of Patent: Apr. 27, 2004

(54) METHOD AND APPARATUS FOR SUPERFINISHING TAPERED ROLLER BEARING

(75) Inventors: Tai Ozaki, Kanagawa (JP); Tomeo Fukano, Saitama (JP); Tooru Sugiyama, Saitama (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/083,654

(22) Filed: Feb. 27, 2002

(65) Prior Publication Data
US 2002/0152616 A1 Oct. 24, 2002

(30) Foreign Application Priority Data

Feb. 27, 2001 (JP) .................................... P. 2001-052241
Feb. 15, 2002 (JP) ....................................... 2002-038450

(51) Int. Cl.[7] ................................................ B24B 1/00
(52) U.S. Cl. ..................... 451/52; 451/312; 451/324; 451/61; 451/163; 451/173
(58) Field of Search ...................... 451/52, 242, 246, 451/312, 324, 51, 61, 163, 164, 173

(56) References Cited

U.S. PATENT DOCUMENTS

| 2,187,471 | A | * | 1/1940 | Hutchinson |
| 3,089,289 | A | * | 5/1963 | Serafin |
| 4,363,196 | A | * | 12/1982 | Uhtenwoldt |
| 4,592,172 | A | * | 6/1986 | Egusa et al. |
| 5,086,592 | A | * | 2/1992 | Schreiber |

* cited by examiner

Primary Examiner—Eileen P. Morgan
(74) Attorney, Agent, or Firm—Sughrue Mion, PLLC (57) ABSTRACT

A superfinishing method of a tapered roller bearing, including the steps of: rotating an outer ring of the tapered roller bearing about a center axis thereof; inserting a straight-shaped superfinishing stone from a front face of outer ring; and slidingly contacting a leading end face of the superfinishing stone with a taper-shaped raceway surface formed in an inner peripheral surface of the outer ring to thereby superfinish the raceway surface. The superfinishing stone is inclined outwardly of the front face of outer ring with respect to a vertical line of the raceway surface.

14 Claims, 7 Drawing Sheets

ONE DIVISION: 0.4μm
ROUNDNESS: 1.3μm

FIG. 6B

ONE DIVISION: 0.4μm
ROUNDNESS: 0.8μm

METHOD AND APPARATUS FOR SUPERFINISHING TAPERED ROLLER BEARING

BACKGROUND OF THE INVENTION

1. Field of the Invention

The present invention relates to a method and an apparatus for slidingly contacting a superfinishing stone with a raceway surface formed in an outer ring of a tapered roller bearing to thereby superfinish the raceway surface and, more particular, to an improved technology which can avoid an interference between the superfinishing stone and the outer ring.

2. Description of the Related Art

Figure 7:
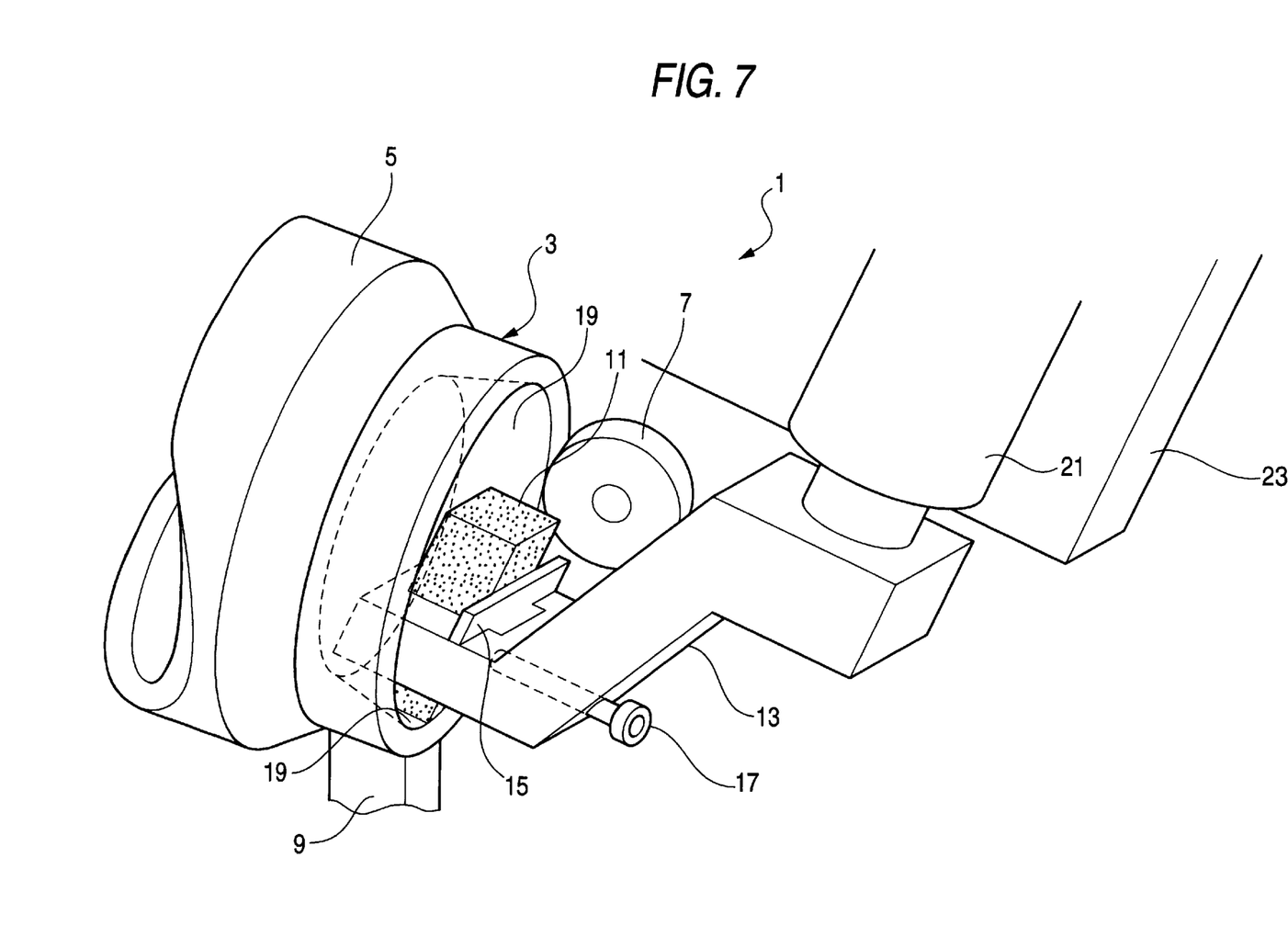
FIG. 7 is an enlarged perspective view of a main portion of a conventional superfinishing apparatus; and, FIG. 8 is an enlarged section view of a main portion of the conventional superfinishing apparatus.

Conventionally, to superfinish a raceway surface of an outer ring of the tapered roller bearing, for example, there is used such a superfinishing apparatus 1 as shown in FIG. 7. The superfinishing apparatus 1 includes a backing plate 5, a pair of pusher rollers 7 (only one of them is shown), a pair of shoes 9 (only the lower portion is shown), a superfinishing stone holder 13, a superfinishing stone clamp bolt 17, a pressurizing cylinder 21 and an oscillation table 23. The backing plate 5 causes an outer ring 3 to rotate. The pair of pusher rollers 7 pushes the outer ring 3 against the backing plate 5. The shoes 9 support the outer ring 3 on the lower and lateral sides thereof. The superfinishing stone holder 13 supports a superfinishing stone 11 at a leading end portion thereof. The clamp bolt 17 is threadedly engaged with the leading end portion of the superfinishing stone holder 13 for fixing the superfinishing stone 11 through a superfinishing stone holding plate 15. The pressurizing cylinder 21 moves the superfinishing stone holder 13 in a direction where the superfinishing stone 11 is pushed against a raceway surface 19. The oscillation table 23 moves the superfinishing stone holder 13 and the pressurizing cylinder 21 in such a manner that the superfinishing stone 11 can approach or move away from the backing plate 5.

And, when the backing plate 5 rotates, the outer ring 3, which is placed on the shoes 9 and is pushed by the pusher rollers 7, is rotated in synchronization with the backing plate 5. Next, the superfinishing stone 11 is moved toward the inner periphery of the outer ring 3 by the oscillation table 23 and the pressurizing cylinder 21 is driven, so that the leading end face of the superfinishing stone 11 is pressed against the raceway surface 19 of the outer ring 3. The superfinishing stone 11 is disposed perpendicular to the raceway surface 19 and the leading end face of the superfinishing stone 11 is slidingly contacted with the raceway surface 19.

The superfinishing stone 11, the leading end portion of which has been worn due to such superfinishing, is moved from the inner periphery of the outer ring 3 to the outside. After then, the superfinishing stone clamp bolt 17 is loosened, whereby the superfinishing stone 11 is fed out to the leading end side thereof. And, by tightening the superfinishing stone clamp bolt 17 again, the superfinishing stone 11 is manually fed out sequentially from the leading end side thereof and is consumed accordingly.

Figure 8:
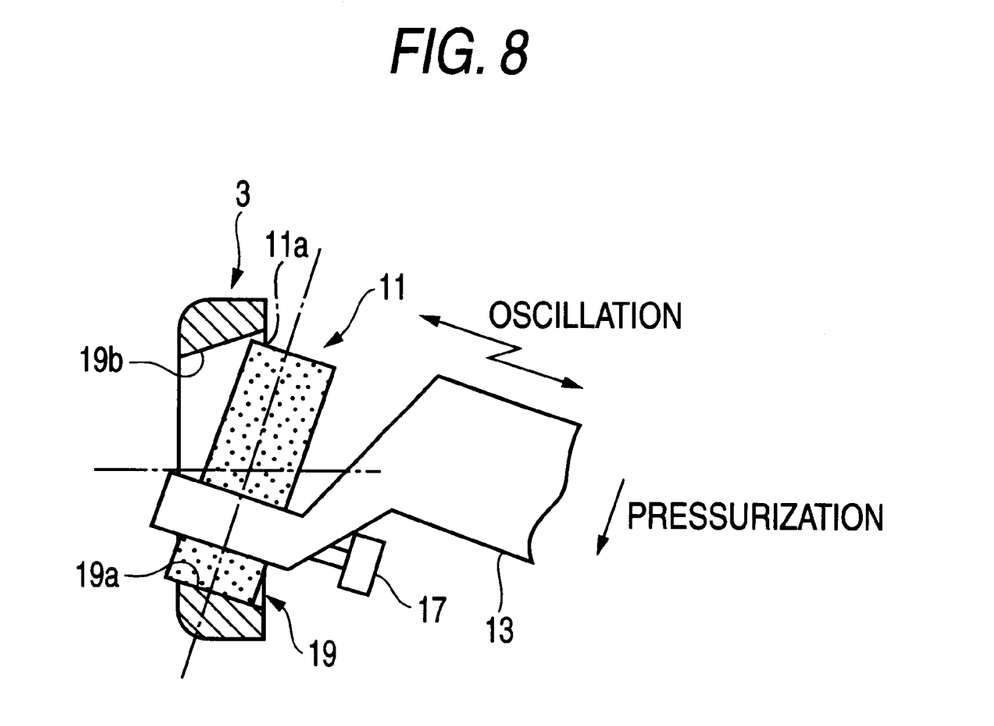

However, in the above-mentioned conventional superfinishing apparatus 1, as shown in FIG. 8, since the superfinishing stone 11 is disposed perpendicular to the raceway surface 19 of the outer ring 3, a non-working raceway surface 19b located on the opposite side to a working raceway surface 19a and a rear end portion 11a of the superfinishing stone 11 interferes with each other, which limits the length of the superfinishing stone 11 to be used.

Therefore, when an outer ring having a small bore diameter is superfinished, it is necessary to use a short superfinishing stone that can be inserted into the inner periphery of the outer ring, which increases the frequency of replacement of the superfinishing stone, resulting in the lowered operation efficiency. Also, a superfinishing stone requires a clamp portion which is not used and, therefore, in the case of a short superfinishing stone, the clamp portion to be wasted increases, which results in the uneconomical superfinishing stone. Further, the interference of the superfinishing stone rear end portion with the non-working raceway surface of the outer ring not only, as described above, disables use of a long superfinishing stone but also provides an obstacle to realization of an automatic superfinishing stone feed-out mechanism which automatically feeds out the superfinishing stone depending on the consumption.

SUMMARY OF THE INVENTION

The present invention aims at eliminating the above drawbacks found in the conventional method and apparatus for superfinishing a tapered roller bearing. Accordingly, it is an object of the invention to provide a method and an apparatus for superfinishing a tapered roller bearing which can reduce the frequency of replacement of superfinishing stones to thereby enhance operability, can enhance the economy of consumption of a superfinishing stone, and can realize automated feed-out of the superfinishing stone.

In attaining the above object, according to a first aspect of the invention, there is provided a superfinishing method of a tapered roller bearing, including the steps of: rotating an outer ring of the tapered roller bearing about a center axis thereof; inserting a straight-shaped superfinishing stone from a front face of outer ring; and slidingly contacting a leading end face of the superfinishing stone with a taper-shaped raceway surface formed in an inner peripheral surface of the outer ring to thereby superfinish the raceway surface. The superfinishing stone is inclined outwardly of the front face of outer ring with respect to a vertical line of the raceway surface.

According to the superfinishing method of the first aspect, since the superfinishing stone is inclined outwardly of the front face of outer ring with respect to the vertical line of the raceway surface, there can be avoided interference between the rear end portion of the superfinishing stone and the non-working raceway surface located on the opposite side to the working raceway surface, thereby removing a length limit of the superfinishing stone. Accordingly, the superfinishing stone can increase the length thereof, which can reduce the frequency of replacement of superfinishing stone. And, the elimination of interference of the rear end portion of the superfinishing stone makes it possible to employ a superfinishing stone feed-out mechanism which sequentially feeds out the long-sized superfinishing stone depending on the consumption of the superfinishing stone. That is, the present superfinishing method can remove an obstacle to an automated superfinishing apparatus.

And, in the present superfinishing method, the inclination angle of the superfinishing stone with respect to the vertical line of the raceway surface may be preferably in the range of 5°–25° in almost all bearings. When the taper half angle of the raceway surface is small, the inclination angle may be more preferably in the range of 10°–20°, and when the outer ring width is large, the inclination angle is further preferably in the range of 15°–20°.

That is, according to the superfinishing method of the tapered roller bearing, since the inclination angle of the superfinishing stone with respect to the vertical line of the raceway surface is in the range of 5°–25°, not only there can be prevented interference between the rear end portion of the superfinishing stone and the non-working raceway surface located on the opposite side to the working raceway surface, which can be caused when the inclination angle is less than 5°, but also there can be prevented from chipping the sharpened shape of the leading end portion of the superfinishing stone, which can be caused when the inclination angle is more than 25°.

In the superfinishing working, it is generally known that the surface pressure of superfinishing stone is an important element of the working conditions. Therefore, in case where the contact area S of superfinishing stone on the working surface increases, the pressurizing force of the superfinishing stone is increased so as to secure the surface pressure of the superfinishing stone. That is, in a state where the contact area S of a superfinishing stone increases, in most cases, since the length of the superfinishing stone in the peripheral direction of a work (outer ring) increases, such increased superfinishing stone pressurizing force has little influence on the shearing force that acts on the superfinishing stone per unit superfinishing stone length in the peripheral direction.

Figure 1:
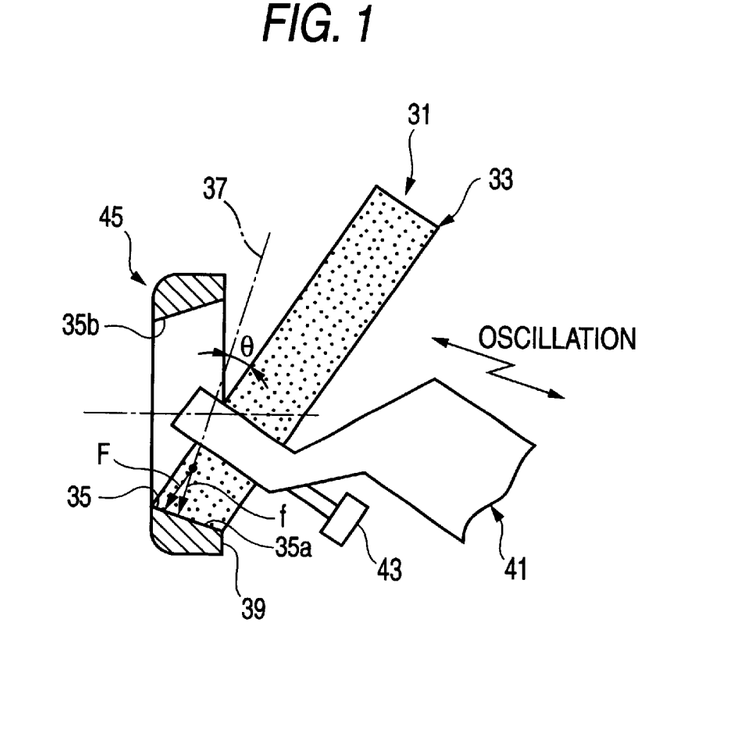
FIG. 1 is an enlarged section view of a main portion of a superfinishing apparatus according to a first embodiment of the invention.

On the other hand, as in the present invention, in case where the superfinishing stone is inclined at an angle of $\theta$, as shown in FIG. 1, since a surface pressure f is a component of the pressurizing force F of the superfinishing stone (a component acting perpendicularly onto the raceway surface of the outer ring; $f=F \cos \theta/S$), it is necessary to increase the pressurizing force F over the conventional method. And, as $\theta$ increases, the pressurizing force F need to be increased exponentially in order to obtain a constant surface pressure f (for example, in the case of $\theta=25°$, the pressurizing force F is increased about 10% when compared with $\theta=0°$). Also, according to the invention, since the leading end portion of the superfinishing stone is sharpened to thereby reduce the area thereof that receives a shearing force. Thus, when $\theta$ is increased, the leading end portion of the superfinishing stone can be chipped easily. Such chipping is easy to occur when, in the working start time, the superfinishing stone moves down and is contacted with a work more often than in the normal working time. The condition in this time varies according to the work rotation speed and the superfinishing stone oscillation speed in the roughing time and in the finishing working time, the specifications of bearings, and the kinds of superfinishing stones. Specifically, it is judged that, up to the degree where the pressurizing force is greater by 15% ($\theta=30°$) than the pressurizing force when the superfinishing stone is not inclined ($\theta=0°$), there can be generally maintained a good condition without the superfinishing stone being chipped; and, in the case of 10% increase ($\theta=25°$) of the order, the superfinishing stone can be used stably, that is, this range can be considered as a practical use range. Further, in the case of $\theta=20°$, the pressurizing force may only be increased by about 6.5%, that is, in this condition, the superfinishing stone can be used more stably.

Also, according to a second aspect of the invention, there is provided a superfinishing apparatus of a tapered roller bearing in which, while rotating an outer ring of a tapered roller bearing about a center axis, the leading end face of a straight-shaped superfinishing stone inserted from a front face of outer ring is slidingly contacted with a taper-shaped raceway surface formed in the inner peripheral surface of the outer ring to thereby superfinish the raceway surface, wherein a superfinishing stone holder holds the superfinishing stone by inclining the superfinishing stone outwardly of the front face of outer ring with respect to the vertical line of the raceway surface.

According to the superfinishing apparatus of the second aspect, in case where the superfinishing stone is held by the superfinishing stone holder, the thus-held superfinishing stone is held in such a manner that it is inclined outwardly of the front face of outer ring with respect to the vertical line of the raceway surface. Therefore, simply by setting the superfinishing stone on the superfinishing stone holder, interference between the rear end portion of the superfinishing stone and the non-working raceway surface can be avoided. This makes it possible to use a long-sized superfinishing stone, which can reduce the frequency of replacement of superfinishing stones and thus can enhance the working efficiency of the superfinishing apparatus.

Further, according to a third aspect of the invention, there is provides a superfinishing apparatus of a tapered roller bearing in which, while rotating an outer ring of a tapered roller bearing about a center axis, the leading end face of a straight-shaped superfinishing stone inserted from a front face of outer ring is slidingly contacted with a taper-shaped raceway surface formed in the inner peripheral surface of the outer ring to thereby superfinish the raceway surface. Wherein an automatic superfinishing stone feed-out mechanism for holding the superfinishing stone by inclining the superfinishing stone outwardly of the front face of outer ring with respect to the vertical line of the raceway surface and also for moving the superfinishing stone to the leading end side thereof depending on the consumption of the leading end face of the superfinishing stone.

According to the superfinishing apparatus of the third aspect, when the leading end face of the superfinishing stone is worn, the superfinishing stone is moved to the leading end side thereof, so that the effective use length of the superfinishing stone can be automatically consumed down to the extreme end portion thereof. Therefore, when compared with a conventional operation in which short superfinishing stones are replaced frequently, the apparatus stop time for superfinishing stone replacement as well as the time and labor necessary for superfinishing stone replacement can be reduced greatly.

Also, in the superfinishing apparatus of the third aspect, the automatic superfinishing stone feed-out mechanism may includes a holder part disposed on an oscillation table for receiving and holding the superfinishing stone in the above-mentioned inclined state, a pressurizing/feed-out cylinder disposed on the holder part for pressurizing the superfinishing stone received in the holder part in the leading end direction of the superfinishing stone, a superfinishing stone wearing detect dog disposed on the holder part and movable simultaneously with the feed-out of the superfinishing stone, and a detecting device fixedly secured to the holder part and is actuated by the superfinishing stone wearing detect dog for detecting the wearing amount of the superfinishing stone.

According to the thus structured superfinishing apparatus, the superfinishing stone received in the holder part can be arranged at a given position of the raceway surface due to the movements of an XY table and the oscillation table. And, the superfinishing stone received in the holder part can be fed out in the leading end direction thereof in a posture in which its interference with the non-working raceway surface is prevented. Such feed-out of the superfinishing stone is attained, for example, by pushing the rear end face of the superfinishing stone by the pressurizing/feed-out cylinder disposed on the rear end portion of the holder part. And, when the superfinishing stone is fed out sequentially due to wearing thereof and the superfinishing stone wearing detect dog being moved together with the superfinishing stone reaches the fixed position of the detecting device, the detecting device is actuated to detect a given wearing amount of the superfinishing stone, to thereby notice the time of replacement of the superfinishing stones.

In this specification, a "non-working raceway surface" represents a raceway surface position of an outer ring such that is situated at a region that the raceway surface position of the outer ring is not subjected to working when the outer ring is worked by the superfinishing stone. Thus, a raceway surface position 35b of FIG. 1 situated opposite to a raceway surface position 35a contacting with the superfinishing stone is defined as the "non-working raceway surface".

BRIEF DESCRIPTION OF THE DRAWINGS

FIGS. 6A and 6B are explanatory views of comparison between the conventional superfinishing method and a superfinishing method according to the invention; specifically, FIG. 6A shows the roundness of a raceway surface worked by the conventional superfinishing method, and FIG. 6B shows the roundness of a raceway surface worked by a superfinishing method according to the invention;

DETAILED DESCRIPTION OF THE PREFERRED EMBODIMENTS

Now, description will be given below in detail of the preferred embodiments of tapered roller bearing superfinishing method and apparatus according to the invention with reference to the accompanying drawings.

Figure 2:
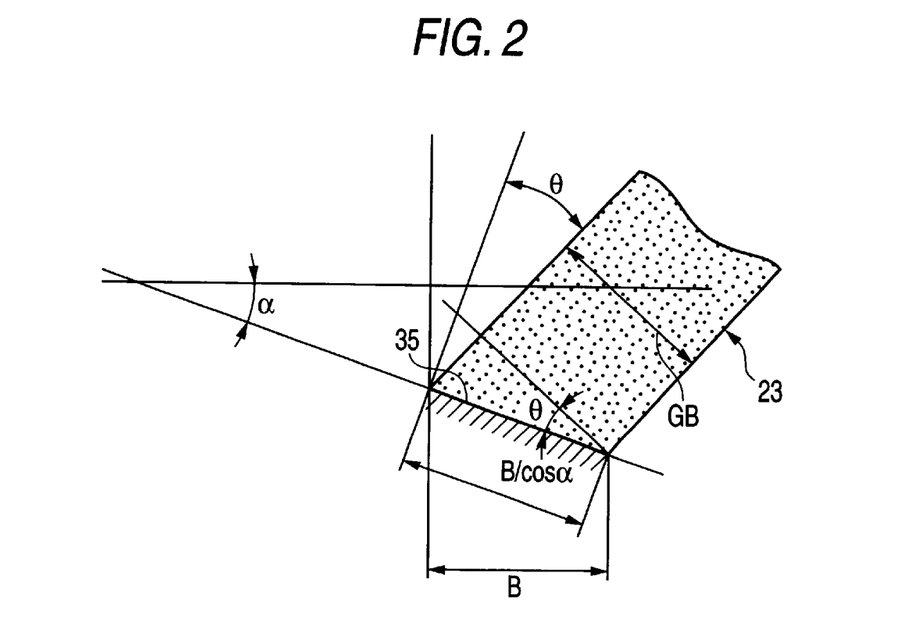
FIG. 2 is an explanatory view for verifying an inclination angle range of a superfinishing stone.

FIG. 1 is an enlarged section view of a main portion of the superfinishing apparatus according to a first embodiment of the invention, and FIG. 2 is an explanatory view for verifying the inclination angle range of a superfinishing stone.

A superfinishing apparatus 31 according to the first embodiment includes a superfinishing stone holder 41 which holds a superfinishing stone 33 while inclining the superfinishing stone 33 outwardly of a front face of outer ring 39 with respect of a vertical line 37 of a raceway surface 35. Further, the superfinishing apparatus 31 includes a backing plate 5, a pusher roller 7, a shoe 9, a pressurizing cylinder 21, and an oscillation table 23, respectively shown in FIG. 7. And, a superfinishing stone clamp bolt 43 is threadedly engaged with the superfinishing stone holder 41, while the superfinishing stone 33 can be fixed to and removed from the superfinishing stone holder 41 by the superfinishing stone clamp bolt 43 through a superfinishing stone holding plate 15 (see FIG. 7).

The inclination angle θ of the superfinishing stone 33, as shown in FIG. 2, can be expressed according to the following equation (1).

$$B/\cos \alpha = GB/\cos \theta \quad (1)$$

where,

B: outer ring width,

GB: oscillation-direction width of superfinishing stone,

α: taper half angle of raceway surface, and,

θ: inclination angle of superfinishing stone.

Also, normally, the bearing is designed such that $2\alpha=12°–58°$. And, from the equation (1), there can be obtained an equation (2).

$$GB=B\times(\cos \theta/\cos \alpha) \quad (2)$$

The equation (2) shows that, when the outer ring large inside diameter is constant, as the outer ring width B increases and as the taper half angle α of the raceway surface decreases, the superfinishing stone is easier to contact with the outer ring. Most of currently manufactured bearings belong to the range of $2\alpha=12°–58°$. When, under these specifications, there is obtained the inclination angle θ that can prevent the superfinishing stone from interfering with the inner peripheral surface of the front face of the outer ring, in the case of $\theta=5–25°$, the interference can be avoided in tapered roller bearings according to almost all of specifications. Further, when taking the interference and the change of the size of the outer ring due to adjustment of the superfinishing stone holder and the oscillation amplitude into consideration, θ may be preferably set in the range of 15–20°.

The lower limit of the inclination angle θ, such as $\theta=5°$ and 15° is a value which is proper for avoidance of interference between the superfinishing stone rear end portion and the outer ring. The upper limit of the inclination angle θ, such as $\theta=25°$ and 20° is determined by the working conditions.

Here, assuming that θ is less than 5°, when the front face 39 of the outer ring 45 is small, the superfinishing stone 33 and outer ring 45 interfere with each other. In some bearings, because of the relationship among the taper half angle of the raceway surface, the outer race width and the outer ring large inside diameter, the superfinishing stone and the front face of outer ring do not interfere with each other even in case where the superfinishing stone is not inclined geometrically. However, when taking it account that not only the space for insertion of the superfinishing stone holder but also the amplitude of the superfinishing stone must be secured around the superfinishing stone, it is necessary to incline the superfinishing stone by an angle of 5° or more. On the other hand, assuming that θ is more than 25°, the leading end portion of the superfinishing stone 33 is sharpened into an acute angle and is thereby easy to be chipped.

That is, the inclination angle θ of the superfinishing stone 33 may be preferably set in the range of 5°–25°. By the way, in the first embodiment, the inclination angle θ is set to 17°. Also, according to a relationship of the equation (1), since the oscillation is made with the amplitude of ±1.5 mm, there is no possibility that the superfinishing stone 33 can be unshaved in the oscillation direction with respect to the raceway surface 35.

Normally, since the superfinishing stone width GB is set slightly smaller than the outer ring width (bearing width) B (here, GB=17 mm, B=18.3 mm), in case where the oscillation amplitude is set properly (for example, 3 mm, that is, ±1.5 mm), the whole of the raceway surface can be worked.

In the superfinishing apparatus 31 having the above structure, when the backing plate 5 (hereinafter, see FIG. 7) is rotated, the outer ring 45, which is placed on the pair of shoes 9 and is pushed by the pusher roller 7, is rotated in synchronization with the backing plate 5. Next, the superfinishing stone 33 is moved to the inner peripheral side of the outer ring 45 by the oscillation table 23 and the pressurizing cylinder 21 is driven, so that the leading end face of the superfinishing stone 33 is pressed against the raceway surface 35 (working raceway surface 35a) of the outer ring 45.

Then, since the superfinishing stone 33 is inclined at an angle of 17° with respect to the vertical line of the raceway surface 35, even when the superfinishing stone length is larger than the bore diameter of the outer ring 45, the interference of the superfinishing stone 33 with the outer ring 45 can be prevented. In case where the pressurizing cylinder 21 is driven so that the superfinishing stone 33 is moved away from the raceway surface 35 and then the oscillation table 23 is driven, the superfinishing stone 33, the leading end portion of which has been worn by superfinishing, is moved outwardly from the inner peripheral side of the outer ring 45. Next, when the superfinishing stone clamp bolt 43 is loosened, the superfinishing stone 33 is fed out to the leading end side thereof by a given length; and, when the superfinishing stone clamp bolt 43 is tightened again, the superfinishing stone 33 is manually fed out sequentially from the leading end side thereof and is thereby consumed.

In a superfinishing method using the present superfinishing apparatus 31, when the superfinishing stone 33 is held by the superfinishing stone holder 41, the thus-held superfinishing stone 33 is held in such a manner that it is inclined outwardly of the front face of outer ring with respect to the vertical line 37 of the raceway surface 35. Therefore, simply by setting the superfinishing stone 33 on the superfinishing stone holder 41, interference between the rear end portion of the superfinishing stone 33 and the non-working raceway surface 35b located on the opposite side to the working raceway surface 35a can be avoided.

This removes the length limit on the length of the superfinishing stone, and makes it possible to increase the length of the superfinishing stone 33 to thereby reduce the frequency of replacement of the superfinishing stone 33. And, since the rear end portion of the superfinishing stone is prevented against interference, for example, it is also possible to employ a superfinishing stone feed-out mechanism which feeds out long-sized superfinishing stones sequentially according to the consumption of the superfinishing stone 33. That is, the present invention can removes an obstacle to the automation of the superfinishing apparatus.

And, since the inclination angle of the superfinishing stone 33 is set in the range of 5°–25°, there can be avoided interference between the rear end portion of the superfinishing stone 33 and the non-working raceway surface 35b located on the opposite side to the working raceway surface 35a, which can occur in the case of the inclination angle being less than 5°; and, there can be prevented the chipping of the leading end portion of the superfinishing stone caused by the sharpened shape thereof, which can occur in the case of the inclination angle being more than 25°.

Next, description will be given below of a second embodiment of a superfinishing apparatus according to the invention.

Figure 3:
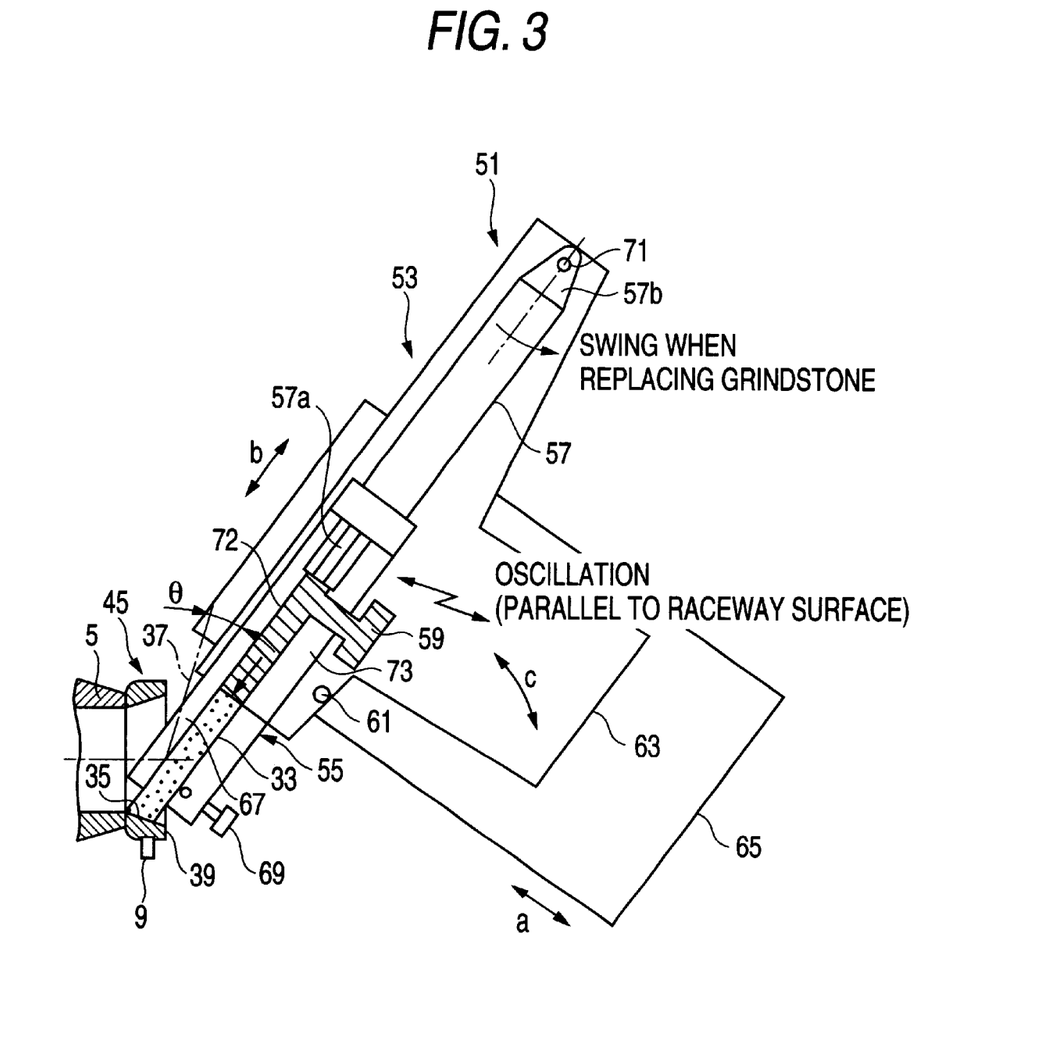
FIG. 3 is an enlarged section view of a main portion of an automatic feed-out apparatus according to a second embodiment of the invention.
Figure 4:
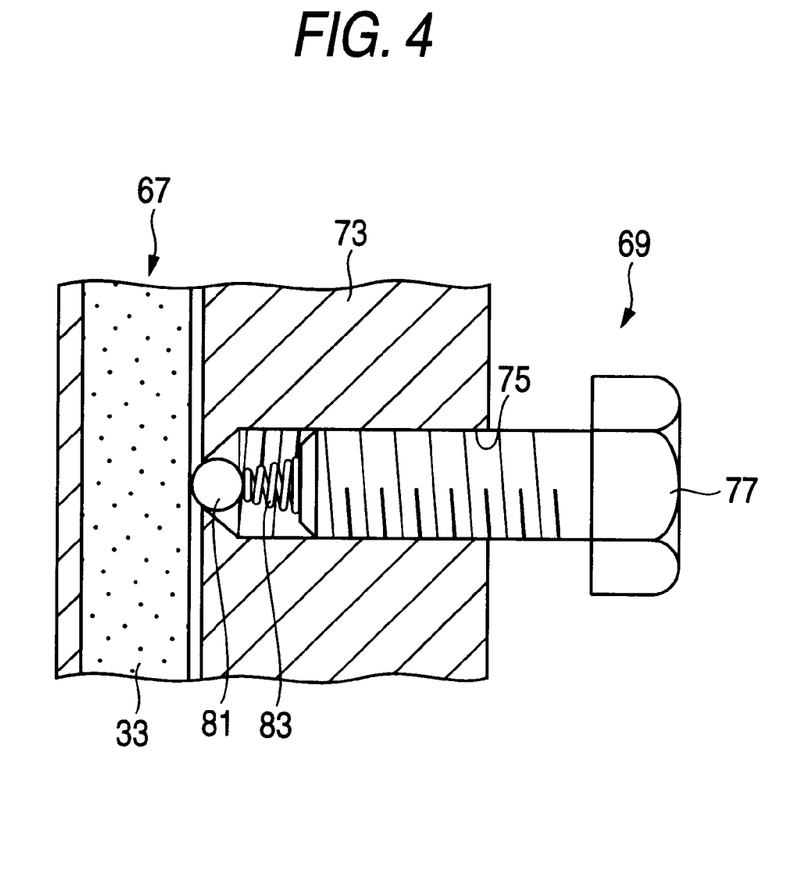
FIG. 4 is a view of an example of the structure of a superfinishing stone drop preventing device.
Figure 5A:
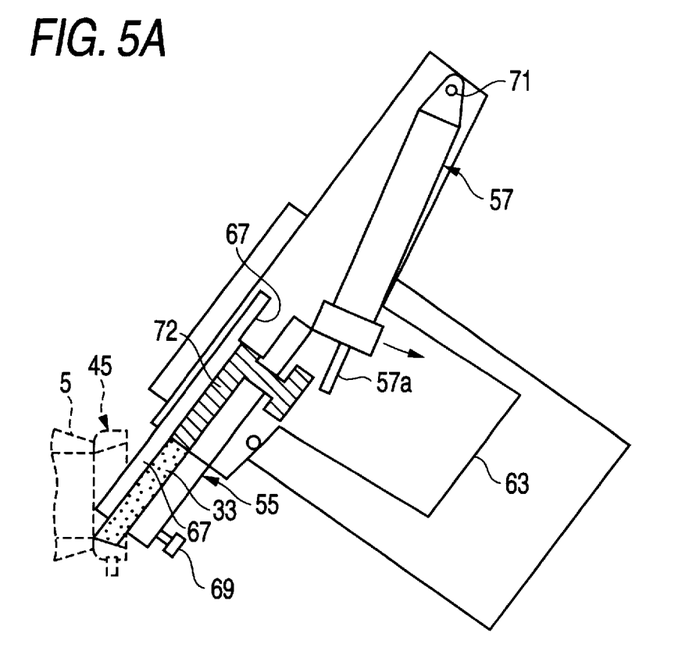
FIGS. 5A and 5B are explanatory views of the superfinishing stone replacing state of the automatic feed-out apparatus shown in FIG. 3.
Figure 5B:
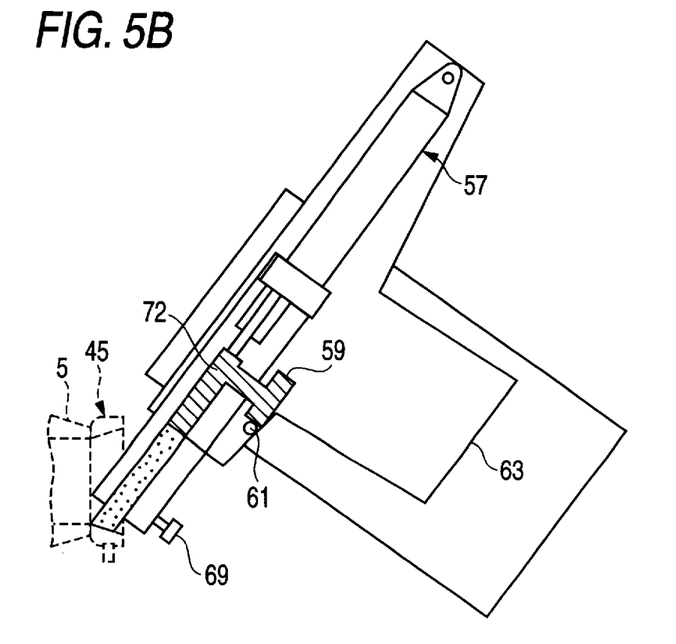

FIG. 3 is an enlarged section view of a main portion of an automatic feed-out apparatus according to the second embodiment, FIG. 4 is a view of an example of the structure of a superfinishing stone drop preventing device, and FIGS. 5A and 5B are explanatory views of the superfinishing stone replacing state of the automatic feed-out apparatus shown in FIG. 3.

A superfinishing apparatus 51 according to the second embodiment includes an automatic feed-out apparatus 53 which not only holds the superfinishing stone 33 so as to be inclined outwardly of the front face of outer ring 39 with respect to the vertical line 37 of the raceway surface 35 but also moves the superfinishing stone 33 to the leading end side thereof depending on the consumption of the leading end face of the superfinishing stone.

The automatic feed-out apparatus 53 includes a holder part 55, a pressurizing/feed-out cylinder 57, a pressurizing jig 72, a superfinishing stone wearing detect dog 59, and a detecting device 61. The holder part 55 is fixedly secured to an oscillation table 63 and is moved in parallel to the raceway surface 35 in accordance with the driving of the oscillation table 63. Also, the oscillation table 63 is fixedly secured to an XY table 65 and can be moved in directions of the arrow marks a, b shown in FIG. 3. By the way, the adjustment of inclination of the superfinishing stone 33 with respect to the raceway surface 35 is made by the swing mechanism of the XY table 65. That is, a θ table (not shown) or the like is disposed on the XY table 65; and, by rotating the θ table, the oscillation table 63 can be oscillated in a direction of the arrow mark c shown in FIG. 3.

The holder part 55 is formed with a superfinishing stone receiving portion 67 for receiving the superfinishing stone 33 in such a manner as to be movable in the linear direction. A superfinishing stone drop preventing device 69 is disposed on the leading end side of the holder part 55. The superfinishing stone drop preventing device 69, as shown in FIG. 4, includes a screw hole 75 penetrating from the outer wall of the holder part 55 to the superfinishing stone receiving portion 67, an adjustment screw 77 rotatably threadedly engageable with the screw hole 75, a pressing member 81 which is received in the screw hole 75 and a portion of which is projected from the screw hole 75 to the superfinishing stone receiving portion 67, and a compression spring 83 interposed between the pressing member 81 and the adjustment screw 77. Therefore, the superfinishing stone 33 received into the superfinishing stone receiving portion 67 is contacted with the pressing member 81 energized by the compression spring 83, which restricts the drop of the superfinishing stone 33 from the superfinishing stone receiving portion 67. Also, this drop restrictive force can be adjusted by the rotational movement of the adjustment screw 77.

The pressurizing/feed-out cylinder 57 is disposed on the rear end side of the holder part 55 and includes a drive shaft 57a which can be extended and retreated in the longitudinal direction of the superfinishing stone receiving portion 67. That is, the pressurizing/feed-out cylinder 57 pushes the superfinishing stone 33 in the leading end direction thereof through the extension of the drive shaft 57a to thereby feed out the superfinishing stone 33. Further, the rear end portion 57b of the pressurizing/feed-out cylinder 57 is swingably mounted on the holder part 55 by a pin 71; and, as shown in FIG. 5A, when the pressurizing/feed-out cylinder 57 is swung about the pin 71 in a state where the drive shaft 57a is retreated, the drive shaft 57a is retreated from the superfinishing stone receiving portion 67.

In the superfinishing stone receiving portion 67, the pressurizing jig 72 is inserted between the superfinishing stone 33 and drive shaft 57a. Specifically, the pressurizing jig 72 is inserted after the superfinishing stone 33 is set in the superfinishing stone receiving portion 67, and it is interposed between the superfinishing stone 33 and drive shaft 57a. A superfinishing stone wearing detect dog 59 is projectedly provided on the pressurizing jig 72, and is projected outside of the holder part 55 from a long groove 73 which is formed so as to penetrate through the wall portion of the holder part 55. Therefore, when the leading end portion of the superfinishing stone 33 is worn, simultaneously with the feed-out of the superfinishing stone 33, the superfinishing stone wearing detect dog 59 is also moved to the leading end side of the holder part 55 at the outside of the holder part 55.

The detecting device 61 is disposed outside of the leading end portion of the holder part 55. The detecting device 61 and superfinishing stone wearing detect dog 59 have such a physical relationship that, when the superfinishing stone 33 is worn to reduce down to a given length, as shown in FIG. 5B, they are contacted with each other. As the detecting device 61, there can be used a sensor and a limit switch that can be operated based on the contact of the superfinishing stone wearing detect dog 59. The detecting device 61 can be electrically connected to, for example, a control unit of the superfinishing apparatus 51. The control unit can output a superfinishing stone wearing alarm in case where a detect signal from the detecting device 61 is input. By the way, the detecting device 61 may also be an optical sensor which can detect the superfinishing stone wearing detect dog 59 in a non-contact manner.

Next, description will be given below of the procedure for replacement of the superfinishing stone 33 when the superfinishing stone 33 is worn to a predetermined length.

When the superfinishing stone 33 is worn to a given length, the superfinishing stone wearing detect dog 59 approaches the detecting device 61. Then, when the detecting device 61 detects the superfinishing stone wearing detect dog 59, the working operation does not proceed to a new working cycle but the whole of the holder part 55 and oscillation table 63 are lifted and slid (in FIGS. 5A and 5B, to the right) so as to move away from the outer ring 45, and are indexed accordingly.

Next, after the drive shaft 57a of the pressurizing/feed-out cylinder 57 is retreated, the pressurizing/feed-out cylinder 57 is manually swung as shown in FIG. 5A. Then, the pressurizing jig 72 is further pushed, to thereby remove the worn superfinishing stone 33 remaining therein. And, the pressurizing jig 72 is pulled out upwardly, and a new superfinishing stone 33 is inserted into the superfinishing stone receiving portion 67 of the holder part 55. This superfinishing stone 33 is extended out from the holder part 55 by a given amount, and the pressurizing jig 72 and pressurizing/feed-out cylinder 57 are set, which completes the replacement of the superfinishing stone 33.

In the superfinishing apparatus 51 according to the second embodiment, the superfinishing stone 33 received in the holder part 55 is arranged at a given position of the raceway surface 35 based on the movements of the oscillation table 63 and XY table 65. And, the superfinishing stone 33 received in the holder part 55 can be fed out freely in the leading end direction thereof in a posture that it is prevented from interfering with the non-working raceway surface. The feed-out of the superfinishing stone 33 is carried out in such a manner that the rear end face of the superfinishing stone 33 is pushed by the pressurizing/feed-out cylinder 57 disposed in the rear end portion of the holder part 55. And, when the superfinishing stone 33 is sequentially fed out due to wearing thereof and then, the superfinishing stone wearing detect dog 59 moving together with the superfinishing stone reaches the fixed position of the detecting device 61, the detecting device 61 is operated to thereby detect a given amount of wearing of the superfinishing stone 33, whereby notice the time of replacement of the superfinishing stone.

Therefore, according to the superfinishing apparatus 51, the effective use length of the superfinishing stone 33 can be automatically consumed down to the extreme end thereof. This can reduce the apparatus stopping time for superfinishing stone replacement as well as the time and labor for superfinishing stone replacement greatly when compared with the conventional operation which has been carried out while replacing short-sized superfinishing stones frequently.

An example of actual working conditions is shown below.
[Working Conditions]
1. Work (tapered roller bearing outer ring: R59Z-7, which is designation of NSK Ltd.)
   outside diameter: 88 mm;
   outer ring large inside diameter: 85 mm;
   raceway surface taper angle $2\alpha$: 31.5°
   width: 18.3 mm.
2. Superfinishing stone (WA1200)
   section dimension: 12×17 mm;
   inclination angle in conventional method: 0° relative to the vertical line;
   inclination angle in method according to the invention: 17° relative to the vertical line;
   oscillation speed (back and forth)
   roughing: 1930 cpm;
   finishing: 970 cpm;
   amplitude: 3 mm.
3. Total time
   30 sec.

By the way, the above-mentioned "total time" means the working time; and 30 sec. is the total time including the times for the roughing and the finishing and the loading of the work. The ratio of the roughing time and the finishing time is approx. 1:(0.5–1). This ratio depends on the finishing condition of the work. Specifically, in the case of a large working allowance, the ratio of the roughing is set large; and, in case where the finishing surface thereof need to be of high quality, the ratio of the finishing working is set large.

Normally, the following relationship exists between the surface pressure of the superfinishing stone and the wearing thereof. That is, when the superfinishing stone exceeds a given surface pressure (critical pressure), the wearing of the superfinishing stone increases suddenly, namely, exponentially. The roughing superfinishes the work with a surface pressure equal to or larger than the critical pressure to thereby remove the working margin (work removal amount by superfinishing), whereas the finishing working superfinishes the work with a surface pressure equal to or smaller than the critical pressure to thereby improve the roughness of the work. In the roughing, the surface pressure is increased and the intersecting angle is increased. And, in the finishing working, the surface pressure and the intersecting angle are both made smaller than those in the roughing. In correspondence to this, the wearing amount of the superfinishing stone is large in the roughing time and is small in the finishing working time. Generally, the roughing and the finishing working are both carried out using the same superfinishing stone. In the present embodiment as well, the two kinds of operations are executed using the same superfinishing stone.

By the way, the invention can also apply to a case in which the roughing working and the finishing working are carried out using different superfinishing stones. Also, it is effective to use the invention in a working operation such as a roughing working which includes a step of wearing a large amount of a superfinishing stone.

When a superfinishing stone is worn, the superfinishing stone is moved toward the working-side raceway surface and the working is still kept on; however, the superfinishing stone need to be replaced with a new one before the superfinishing stone cannot be held by the superfinishing stone clamp bolt. In the conventional method, the superfinishing stone requires the length thereof which is smaller than the outer ring large inside diameter of a tapered roller bearing and is capable of indexing, specifically, the order of 50 mm, while the clamp position is set to be approx. 10 mm from the rear end portion of the superfinishing stone. And, when the length of the superfinishing stone becomes approx. 15 mm (that is, when it is worn by approx. 35 mm; the number of processed works is about 1700.), the superfinishing stone is replaced.

On the other hand, the invention can use the long-sized superfinishing stone. For example, when a superfinishing stone having a length of approx. 100 mm is used, the wearing amount of the superfinishing stone up to the replacement thereof can be approx. 85 mm and the working number up to the replacement thereof can be about 4200 that is, about 2.5 times the working amount in the conventional method.

Now, Table 1 shows examples in which the invention is applied to various bearing specifications. As can be seen clearly from Table 1, according to the invention, tapered roller bearings respectively having a raceway surface taper angle $2\alpha=12°-58°$ are worked with an inclination angle $\theta=5°-25°$ while avoiding interference between the superfinishing stone rear end portion and the outer ring. In some bearings, because of the relationship among the taper half angle of the raceway surface, the outer race width and the outer ring large inside diameter, the superfinishing stone and the front face of outer ring do not interfere with each other even in case where the superfinishing stone is not inclined geometrically. However, when taking it account that not only the space for insertion of the superfinishing stone holder but also the amplitude of the superfinishing stone need to be secured around the superfinishing stone, it is necessary to incline the superfinishing stone by an angle of 5° or more. And, it is possible to use a superfinishing stone having a length 2–4 times the length of the conventional superfinishing stone; and, up to superfinishing stone replacement, the works can be processed in number 1.5–9 times the number of works in the conventional method. In an example 1, up to superfinishing stone replacement, the working amount is 2.5 times the working amount in the conventional method and, in examples 2 and 3, the working amount is 4–9 times.

Next, description will be given below of the comparison results of the roundness of raceway surfaces worked according to the conventional superfinishing method and the present invention.

Figure 6A:
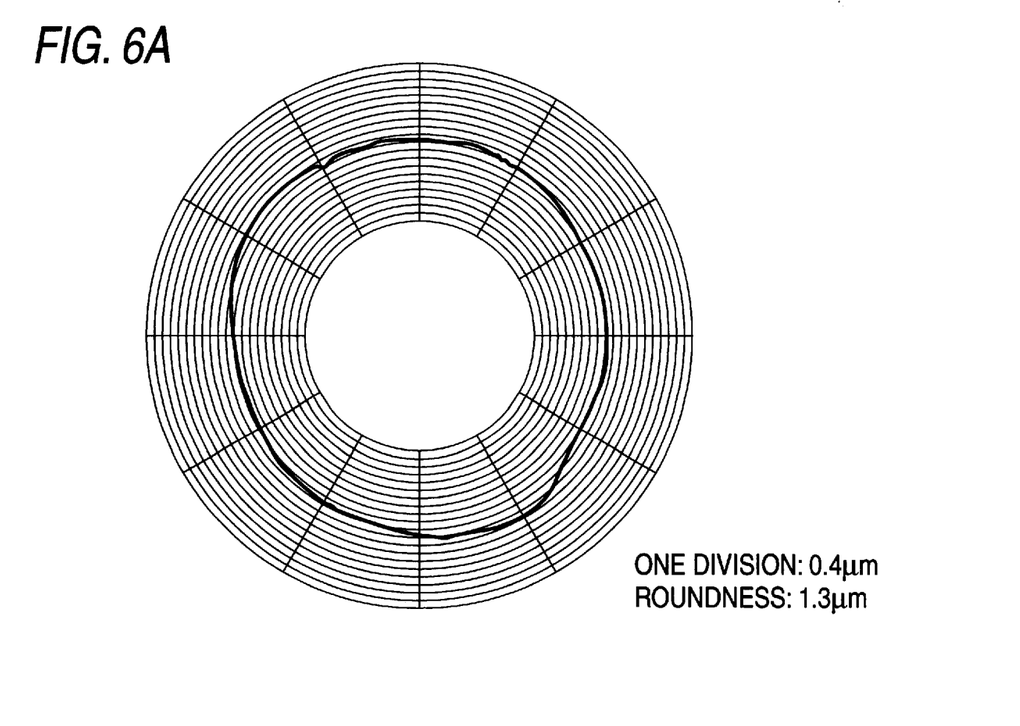
Figure 6B:
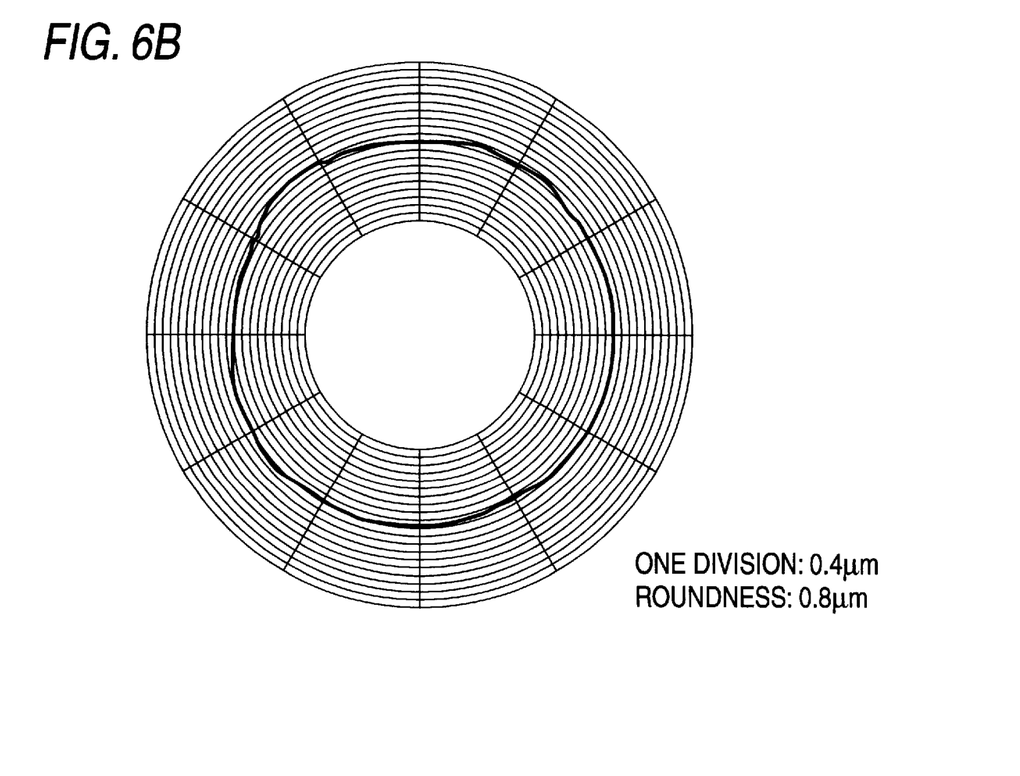

FIGS. 6A and 6B are explanatory views of comparison between the roundness of a raceway surface worked according to the conventional superfinishing method (FIG. 6A), and the roundness of a raceway surface worked by a superfinishing method according to the invention (FIG. 6B).

As can be seen from FIGS. 6A and 6B, the roundness of a raceway surface shown in FIG. 6A according to the conventional superfinishing method is 1.3 $\mu$m, and the roundness of a raceway surface shown in FIG. 6B according to a superfinishing method of the invention is 0.8 $\mu$m. This shows that the superfinishing method according to the invention can provide an accuracy equal to or higher than an accuracy obtained by the conventional superfinishing method.

As has been described hereinbefore in detail, in a superfinishing method of a tapered roller bearing according to the invention, since the superfinishing stone is inclined outwardly of the front face of outer ring with respect to the vertical line of the raceway surface, there can be avoided interference between the rear end portion of the superfinishing stone and the non-working raceway surface which is the opposite side to the working raceway surface, to thereby remove a length limit on the length of the superfinishing stone. As a result of this, the length of the superfinishing stone can be increased, which can reduce the frequency of replacement of the superfinishing stone, thereby being able to enhance the operation efficiency. Also, even the clamp portion, which has been conventionally unusable and wasted, can also be made consumable to thereby enhance the economy of the superfinishing stone. Further, since the rear end portion of the superfinishing stone can be prevented against interference and the superfinishing stone can be increased in length, the automated superfinishing stone feed-out operation can also be realized.

While only certain embodiments of the invention have been specifically described herein, it will apparent that numerous modifications may be made thereto without departing from the spirit and scope of the invention.

TABLE 1

| | Outside diameter (mm) | Outer ring large inside diameter (mm) | Taper angle $2\alpha(°)$ | Outer ring width (mm) | Superfinishing stone width (mm) | Inclination angle $\theta(°)$ | Distance between rear end portion of superfinishing stone and clamp (mm) | Grinding work number ratio up to replacement of the invention to conventional art | Superfinishing stone initial length ratio of the invention to conventional art | Ratio of superfinishing stone replacement frequency of the invention to conventional art |
|---|---|---|---|---|---|---|---|---|---|---|
| Example 1 (R59Z-7) | 88 | 85 | 31.5 | 18 | 17 | 17 (15–20) | 3 | 2.4 | 2 | 0.4 |
| Example 2 (HR30203J) | 40 | 36.5 | 26 | 11 | 10 | 17 | 3 | 8.5 | 4 | 0.12 |
| Example 3 (HR30206J) | 62 | 57 | 28 | 14 | 13 | 17 | 3 | 4.3 | 2.9 | 0.23 |
| Example 4 (HR30208J) | 80 | 74 | 28 | 16 | 15 | 17 | 3 | 2.4 | 2 | 0.4 |

TABLE 1-continued

|  | Outside diameter (mm) | Outer ring large inside diameter (mm) | Taper angle 2α(°) | Outer ring width (mm) | Superfinishing stone width (mm) | Inclination angle θ(°) | Distance between rear end portion of superfinishing stone and clamp (mm) | Grinding work number ratio up to replacement of the invention to conventional art | Superfinishing stone initial length ratio of the invention to conventional art | Ratio of superfinishing stone replacement frequency of the invention to conventional art |
|---|---|---|---|---|---|---|---|---|---|---|
| Example 5 (LM48510R) | 65 | 60 | 28 | 14 | 13 | 17 | 3 | 2.4 | 2 | 0.4 |
| Example 6 (L11710R) | 40 | 36 | 21.5 | 11 | 9 | 17 (15–17) | 3 | 8.5 | 4 | 0.12 |

Examples 1–6 are manufactured by NSK Ltd. and reference characters within parentheses express designation

What is claimed is:

1. A superfinishing method of a tapered roller bearing, comprising the steps of:
    rotating an outer ring of the tapered roller bearing about a center axis thereof;
    inserting a superfinishing stone from a front face of the outer ring; and
    slidingly contacting a leading end face of the superfinishing stone with a tapered raceway surface formed in an inner peripheral surface of the outer ring to thereby superfinish the raceway surface,
    wherein the superfinishing stone is inclined outwardly of the front face of the outer ring with respect to a vertical line of the raceway surface.

2. The superfinishing method according to claim 1, wherein the superfinishing stone has a length larger than an outer ring large inside diameter, and the superfinishing stone has such an inclination angle as to prevent a rear end portion of the superfinishing stone from interfering with a non-working raceway surface opposite to a working raceway surface to be slidingly contacted by the leading end face of the superfinishing stone.

3. The superfinishing method according to claim 1, wherein an inclination angle of the superfinishing stone with to the vertical line is in the range of 5°–25°.

4. A superfinishing apparatus of a tapered roller bearing, comprising:
    a rotating device rotating an outer ring of the tapered roller bearing about a center axis thereof;
    a superfinishing stone holder holding a superfinishing stone;
    a driving device moving the superfinishing stone holder so that the superfinishing stone is inserted from a front face of the outer ring and a leading end face of the superfinishing stone is slidingly contacted with a tapered raceway surface formed in an inner peripheral surface of the outer ring to thereby superfinish the raceway surface,
    wherein the superfinishing stone holder holds the superfinishing stone in such a manner that the superfinishing stone is inclined outwardly of the front face of the outer ring with respect to the vertical line of the raceway surface.

5. The superfinishing apparatus according to claim 4, wherein the superfinishing stone has a length larger than an outer ring large inside diameter, and the superfinishing stone holder inclinedly holds the superfinishing stone such that a rear end portion of the superfinishing stone is prevented from interfering with a non-working raceway surface opposite to a working raceway surface to be slidingly contacted by the leading end face of the superfinishing stone.

6. The superfinishing apparatus according to claim 4, wherein the superfinishing stone holder inclinedly holds the superfinishing stone in such a manner that an inclination angle of the superfinishing stone with respect to the vertical line of the raceway surface is in the range of 5°–25°.

7. The superfinishing apparatus according to claim 4, further comprising:
    an automatic feed-out mechanism for moving the superfinishing stone in a feed-out direction, toward the outer ring, in accordance with the consumption of the leading end face of the superfinishing stone.

8. The superfinishing apparatus according to claim 7, wherein the automatic feed-out mechanism comprises:
    a holder part disposed on an oscillation table for receiving and holding the superfinishing stone while being inclined with respect to the vertical line of the outer ring;
    a pressurizing/feed-out cylinder for pressurizing the superfinishing stone received in the holder part in the feed-out direction of the superfinishing stone;
    a superfinishing stone wearing detect dog movable, in the feed-out direction, together with the superfinishing stone; and
    a detecting device detecting a wearing amount of the superfinishing stone by operating when the superfinishing stone wearing detect dog is moved to a given position.

9. The superfinishing apparatus according to claim 8, wherein the automatic feed-out mechanism further comprises a control unit receiving a signal from the detecting device when the wearing of the superfinishing stone exceeds a predetermined amount, and outputting a warning alarm.

10. The superfinishing apparatus according to claim 8, wherein the automatic feed-out mechanism further comprises a control unit receiving a signal from the detecting device when the wearing of the superfinishing stone exceeds a predetermined amount, and controlling to move the holder part and the oscillation table away from the outer ring without performing the next processing.

11. The superfinishing apparatus according to claim 10, wherein the pressurizing/feed-out cylinder includes a drive shaft extendable along a longitudinal direction of the superfinishing stone,
    wherein the automatic feed-out mechanism further comprises a pressurizing jig disposed between the super finishing stone and the drive shaft of the pressurizing/feed-out cylinder, and wherein the worn superfinishing stone is removed by pressing the worn superfinishing stone after retreating the drive shaft and swinging the pressurizing/feed-out cylinder, a new superfinishing stone is inserted into the holder part in such a manner that the new superfinishing stone is extended from the holder part by a given amount, and the pressurizing jig and the pressurizing/feed-out cylinder are set to press the new superfinishing stone, whereby the replacement of the superfinishing stones is completed.

12. The superfinishing apparatus according to claim 4, wherein a taper angle of the tapered roller bearing is set so that $2\alpha=12°-58°$, wherein $\alpha$ is a taper half-angle of the raceway surface.

13. The superfinishing apparatus according to claim 4, wherein the superfinishing apparatus performs a roughing processing.

14. The superfinishing apparatus according to claim 13, wherein the superfinishing apparatus further performs a finishing processing.

* * * * *